United States Patent

[11] 3,626,367

[72] Inventors Donald W. Howard;
  Dewey W. Eppley, both of South Bend, Ind.
[21] Appl. No. 887,016
[22] Filed Dec. 22, 1969
[45] Patented Dec. 7, 1971
[73] Assignee The Bendix Corporation

[54] VEHICLE SUBSYSTEM MONITORS
  4 Claims, 5 Drawing Figs.
[52] U.S. Cl. ............................................. 340/52 F,
  340/412
[51] Int. Cl. ............................................. B60q 1/00
[50] Field of Search .................................. 340/52, 27,
  336, 412, 413, 414, 415; 178/15, 30

[56] References Cited
UNITED STATES PATENTS
3,541,550 11/1970 Hamre .......................... 340/52 X
3,512,405 5/1970 Schlicher ...................... 340/415 X
OTHER REFERENCES
IBM Technical Disclosure Bulletin; R. W. Landauer; Electroluminescent Display; April 1966; Vol. 8, No. 11; Pages 1569 and 1570.

Primary Examiner—Alvin H. Waring
Attorneys—C. F. Arens and Plante, Arens, Hartz, Smith and Thompson ABSTRACT: A multiple error detection system utilizing light-emitting diodes to form a character representation in response to a given error signal input.

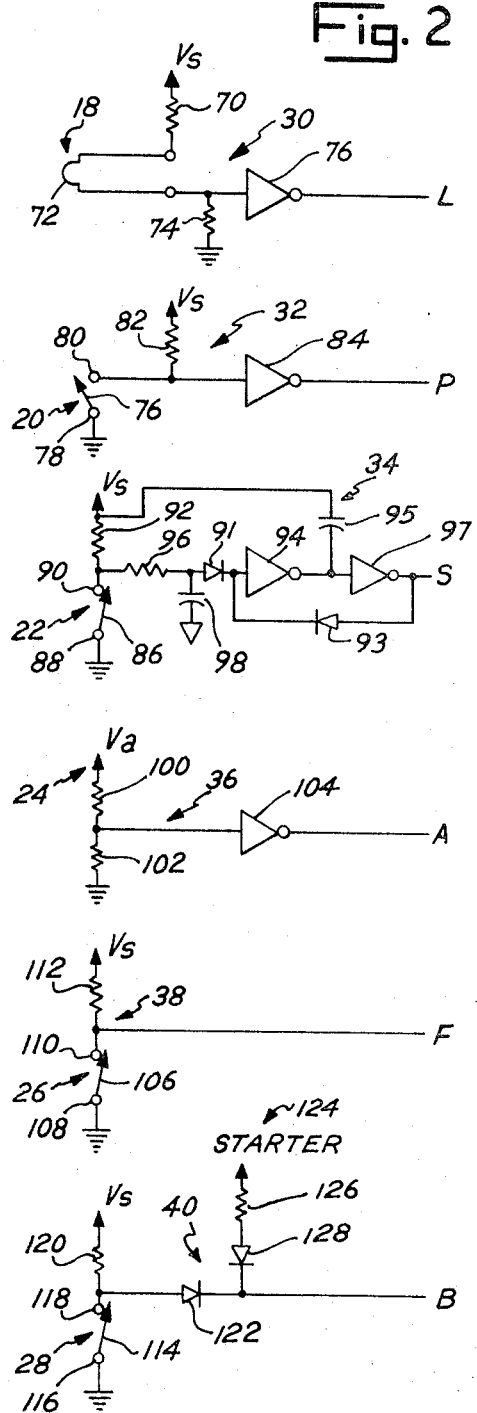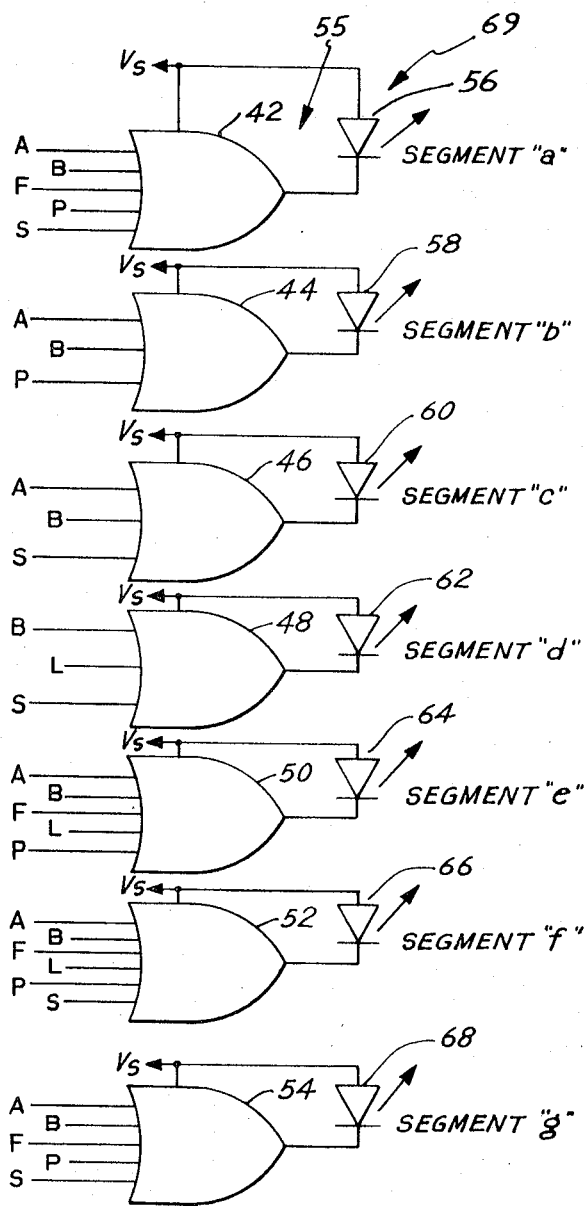
Fig. 2
Fig. 3

PATENTED DEC 7 1971

+12 VOLTS

INVENTORS
DONALD W. HOWARD
BY & DEWEY W. EPPLEY

Plante, Arens, Hartz
Smith & Thompson ATTORNEYS

VEHICLE SUBSYSTEM MONITORS

BACKGROUND OF THE INVENTION

In recent years there has been an increase in the type of safety devices and warning systems used in the automotive industry. Features are being added to the automobile either by popular demand or legislation to provide the operator with an indication of the performance of the automobile. The present vehicle split-braking system includes a warning light which will indicate a loss of front or rear brake pressure during a brake application. A warning light may be "latched" on some model vehicles while on others the warning light is energized only on a transient basis. Self-test of the above may be automatic when the vehicle is started, or it may be checked by a second function such as a parking brake.

Monitoring of other brake parameters is being considered today. These parameters include master cylinder fluid level, lining wear, and adaptive braking control performance. With this increased demand it becomes apparent that a multiplicity of indicators will be required to detect all functions. Add to this increased indication needs for power plant, adaptive steering, adaptive speed control, and emission control devices, and the instrument panel will become a maze of indicators which would distract rather than enhance the original purpose.

What is needed is a monitor that is simple, yet will convey an increased amount of information in a concise and orderly fashion to the operator of the automobile. The monitor should not only tell whether the system is in a "go" or "no-go" type condition, but it also should tell the operator of the vehicle which subsystem is in a "go" or "no-go" condition. This gives a diagnostic capability to the operator with a consequential potential savings in maintenance cost. For example, in modern vehicle braking subsystems the operator should know if the parking brake is on, if the master cylinder fluid level is low, if the front or rear brake pressure is low, if the brake lining is worn, if the adaptive braking control is malfunctioning, or if the vacuum is lost in the power brake boost. Also, a self-check of the circuit should be provided so that the operator will know if the circuit itself is functioning properly.

The monitoring of these many different functions becomes possible with recent developments in integrated circuits, light-emitting diodes, and fiber optics. Current technological advances in the integrated circuits field permits several hundred active elements to be combined on a single chip, but the cost per function of an integrated circuit is limited on a small quantity basis. However, economic feasibility of custom circuits in production quantities can be predicted in the automotive industry. Light-emitting diodes have just recently become available on the commercial market. On a mass production basis, the light-emitting diodes will be economically feasible in automotive industry. If light emitted from the light-emitting diodes does not give the desired character representation, the use of fiber optic techniques can reshape the light emitted from the diode to form the given character representation desired.

SUMMARY OF THE INVENTION

Accordingly, it is an object of this invention to utilize a single monitor for a number of error inputs.

It is a further object of this invention to utilize a plurality of sensors and a plurality of light-emitting diodes that are interconnected in such a manner that a different visual character representation output is formed for an error signal from a given sensor.

It is a further object of this invention to provide signal conditioning to the sensor outputs whereby the sensor outputs can be accepted by digital logic which controls the previously arranged light-emitting diodes to form a different lighted alphabetic character for each error detected by the sensors.

These and other objects of the invention are accomplished by changing the sensor outputs to a given voltage level. This voltage level is fed into a NOR gate which controls a given segment of the character representation. By selecting the proper combination of NOR gates, a given character representation can be formed by the illumination of its different segments. Each segment may be formed by one, or a combination, of light-emitting diodes depending on the amount of illumination which is needed. If better clarity in the character representation is desired, a fiber optic display may be utilized.

DESCRIPTION OF THE DRAWINGS

The invention herein disclosed will be more fully understood when taken together with the accompanying drawings in which:

FIG. 2 is a diagrammatic circuit diagram of the error detection system shown in FIG. 1;

FIG. 3 is an illustrative character representation that can be formed by the outputs of FIG. 2;

DESCRIPTION OF THE PREFERRED EMBODIMENTS

Figure 1:
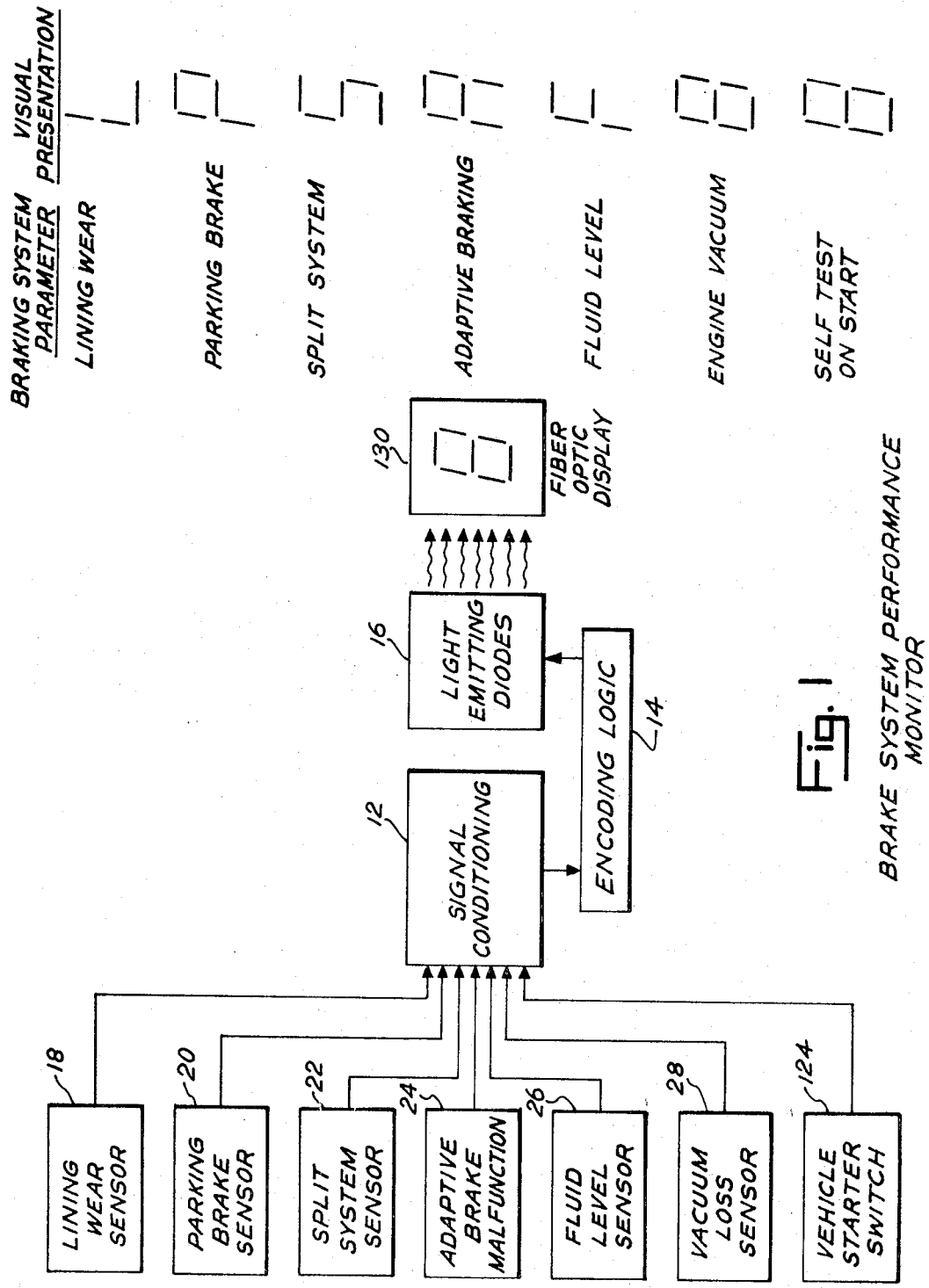
FIG. 1 is an illustrative block diagram that shows the normal signal flow in the error detection system.

With continued reference to the accompanying figures initial attention is directed to FIG. 1. A plurality of sensors, represented generally by reference numeral 10, detect an out-of-tolerance condition in a subcomponent of a braking system. The output of the sensors 10, if necessary, is changed to a given voltage level by signal conditioner 12. This voltage level is fed into encoding logic 14 which controls a number of light-emitting diodes 16. These light-emitting diodes 16 are arranged in such a manner to form a character representation, such as an alphabetic or numeric readout. To give a better visual indication of the character representation, a fiber optic display 130 may be used.

By referring to the logic diagram as shown in FIG. 2, one can better understand the forming of the character representation. The output of the sensors 18, 20, 22, 24, 26, and 28, after being converted to a given voltage level by the respective signal conditioner 30, 32, 34, 36, 38, and 40, is represented by the letters L, P, S, A, F, and B, respectively. These outputs L, P, S, F, and B, are connected to NOR gates 42, 44, 46, 48, 50, 52 and 54 contained in encoding logic 14. The normal output from the signal conditioner 12 is zero volts. A positive voltage indicates an out-of-tolerance condition. With no out-of-tolerance condition all of the inputs on the NOR gates will be zero. If there is no input on a NOR gate, the output of the NOR gate should be at a positive voltage level. The output of the NOR gates 42, 44, 46, 48, 50, 52, or 54, represented generally by numerals 55, is connected to one side of the light-emitting diodes 56, 58, 60, 62, 64, 66, or 68, respectively, represented generally by numeral 69. The other side of the light-emitting diodes 69 is connected to a voltage source $V_s$. With a positive voltage approximately equal to $V_s$ on the output of a NOR gate and the voltage source $V_s$ connected to the other side of the light-emitting diode, there will be no conduction through the light-emitting diode because both sides are at approximately the same voltage potential.

However, when a voltage is applied to the input of the NOR gate by one of the sensor devices 18, 20, 22, 24, 26, or 28, the output of the NOR gate will go from a positive to a zero level causing the light-emitting diode to be connected between the voltage source $V_s$ and a zero potential whereupon current conduction will begin. During conduction the light-emitting diode illuminates. The illumination from the light-emitting diode can be used to form a segment of a character representation. As can be seen from FIG. 2, each NOR gate and light-emitting diode combination is used to form one segment of a seven-segment character. Segment "a" can be formed from an input of A, B, F, P, or S; Segment "b," an input of A, B, or P;

segment "C," an input of A, B, or S; segment "d," an input of B, L, or S; segment "e, " an input of A, B, F, L, or P; Segment "f,"an input of A, B, F, L, P, or S; Segment "g," an input of A, B, F, P, or S. The arrangement of these separate segments is shown in FIG. 3.

Before following each sensor output through the encoding logic 14, a brief explanation of the light-emitting diode is in order. As forward bias is applied to the diode, electrons are injected into the P-layer from the N-layer and, conversely, holes are injected into N-layer from the P-layer. The near surface combinations in a light-emitting diode results in a photon emission or visible light. The color of the light is a function of the bandgap energy (electron volts) as controlled by the doping and purity of the materials. A typical light-emitting diode is a phosphide doped gallium arsenide diode which can produce 200-foot lamberts at 20 milliamperes of forward current. An example of this type of light-emitting diode can be found in the technical data sheet of Monsanto, Alpha Numeric Display, MAN-1. Another example of prearranged segments to form given character representations can be found in the technical data sheet of Monsanto, Visible Solid State Light Source, MV-10B.

Taking each sensor individually, a voltage $V_s$ is applied through the resistor 70 to lining probes 72 and through another resistor 74 to ground to provide the lining wear sensor 18 with a source of power. The output of the lining wear sensor 18 is inverted through inverter 76 to give output L. Output L is fed into the NOR gates that control Segments, "d," "e," and "f," thereby forming the visual representation of the letter L.

The parking brake sensor 20 controls a normally open contact 76 with one side 78 of the normally open contact 76 connected to ground. The other side 80 of the normally open contact 76 is connected through a resistor 82 to the voltage source $V_s$. The output of the parking brake sensor 20 is normally at a positive voltage until an error is sensed whereby the normally open contact 78 is closed and the voltage drops to zero. The output of the parking brake sensor 20 is fed through an inverter 84 in the signal conditioner 32 to form the output voltage P. P is fed into the NOR gate and light-emitting diode combination that makes Segments "b," "a," "e," "f," and "g,38 thereby forming the visual presentation of the letter P.

A split system sensor 22 operates a normally closed switch 86 when there is an unbalanced condition between the front and rear brakes. One side 88 of the normally closed switch 86 is connected to ground and the other side 90 through a resistor 92 to the voltage source $V_s$. Upon brake application if there is a pressure differential between the front and rear brakes, the contact 86 will momentarily open thereby supplying a positive voltage output. This positive voltage output is processed in the signal conditioner 34 by feeding into an inverter 94 through a resistor 96 and diode 91. The signal conditioner 34, which also performs a latching function, uses an R-C filter time constant consisting of resistor 96 and capacitor 98 connected between the split system sensor 22 and the input to inverter 94. Capacitor 95 sets inverter 97 to an initial conducting state with a zero voltage output S when voltage $V_s$ is applied and sensor switch 22 is closed. The output of inverter 94 is at a positive voltage level. If the sensor 22 opens for a period exceeding the R-C time constant (96 and 98), inverter 94 is switched on, which pulls down the output of inverter 94 to zero. Consequently, inverter 97 stops conducting which raises the output S to a positive voltage level. The output S is fed back through diode 93 to hold the inverter 94 in the conducting state or latched "ON." The diode 91 prevents breakdown of the latching function if sensor 22 later closes. Therefore, for a momentary opening of the normally closed switch a steady state voltage output S can be realized. The voltage S is connected to the NOR gates and light-emitting diodes that control Segments "a," "c," "d," "f," and "g," thereby forming the visual presentation of the letter S.

An adaptive brake malfunction 24 will remove the voltage $V_A$ from the cross resistor 100 and 102. With removal of this voltage $V_A$, the input to inverter 104 becomes zero thereby giving a positive voltage output of A. Voltage A controls NOR gate and light-emitter diode combinations that form Segments "a," "b," "c," "e," "f," and "g," thereby forming the visual presentation of the letter A.

The fluid sensor 26 operates at normally closed contact 106 with one side 108 of the normally closed contact connected to ground, and the other side 110 of normally closed contact 106 being connected through a resistor 112 to a positive voltage source $V_s$. No signal conditioning being necessary, the output of the fluid level sensor 26 feeds directly into the encoder 14 and is represented by the letter F. F feeds into the NOR gate-light emitter diode combinations that form the Segments "a," "f," "f," and "g," thereby forming a visual presentation of the letter F.

The vacuum loss sensor 28 controls a normally closed contact 114. One side 116 of the normally closed contact 114 is connected to ground. The other side 118 of the normally closed contact 114 is connected through a resistor 120 to a voltage source $V_s$. The output of the vacuum loss sensor 28 could be fed directly into the encoding logic 14. However, to provide an auxiliary test means 124, it is connected to the encoding logic 14 through a diode 122. The test means 124 which is connected to the encoding logic side of the diode 122 if formed by a connection from the starter through a resistor 126 and a diode 128 to form the voltage B. Voltage B, which also represents a vacuum loss, controls the NOR gate-light emitting diode combinations of Segments "a," "b," "c," "d," "e," "f," and "g," thereby forming the visual presentation of the letter B. Because letter B illuminates all of the segments, it can also be used as the test means 124 to determine if all light-emitting diodes 69 are functioning properly.

The interconnections for the encoding logic 14 is determined by writing a truth table which relates the sensor output as a function of the desired alphabetic character as shown below:

TABLE I.—TRUTH TABLE FOR BRAKE SYSTEM PERFORMANCE MONITOR

| Sensor and alphabetic character | Segment identification | | | | | | |
|---|---|---|---|---|---|---|---|
| | a | b | c | d | e | f | g |
| Lining wear "L" | 0 | 0 | 0 | 1 | 1 | 1 | 0 |
| Adaptive braking "A" | 1 | 1 | 1 | 0 | 1 | 1 | 1 |
| Parking brake "P" | 1 | 1 | 0 | 0 | 1 | 1 | 1 |
| Fluid level "F" | 1 | 0 | 0 | 0 | 1 | 1 | 1 |
| Split system "S" | 1 | 0 | 1 | 1 | 0 | 1 | 1 |
| Power boost "B" | 1 | 1 | 1 | 1 | 1 | 1 | 1 |
| Self test | 1 | 1 | 1 | 1 | 1 | 1 | 1 |

If a good character representation cannot be obtained directly from the light-emitting diodes 69, the individual Segments 56, 58, 60, 62, 64, 66, and 68 can be reshaped by the use of fiber optic techniques depending upon the size of the character representation desired. Fiber optics can greatly reduce the number of light-emitting diodes 69 required and reduce the encoded circuit 14 complexity. An example of the fiber optic display 130 is shown in FIG. 1.

Figures 4, 5:
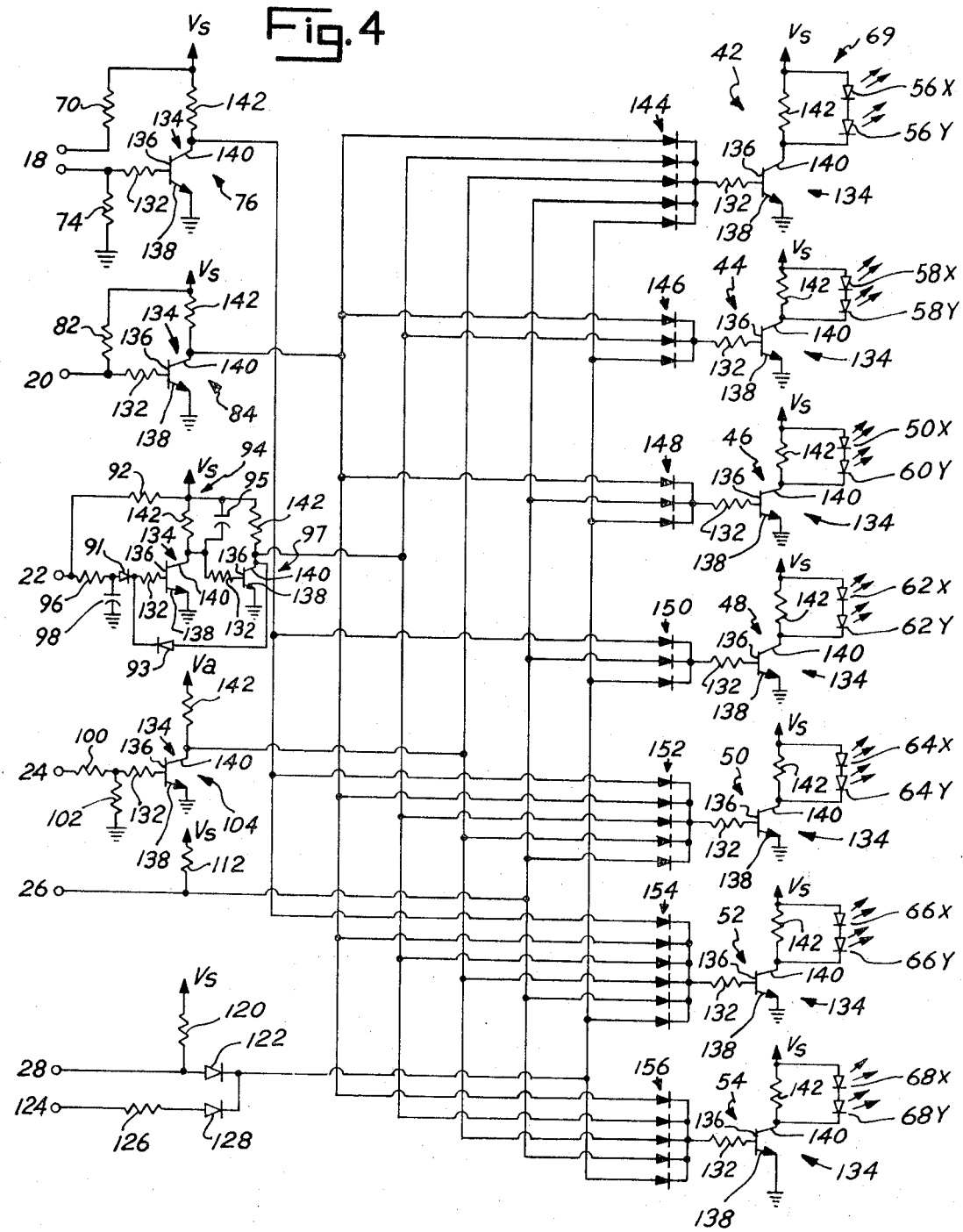
FIG. 4 is a circuit diagram of the preferred embodiment shown in FIG. 1.
FIG. 5 is a circuit diagram of a voltage regulator operated from the automobile battery for supplying regulated voltage to the error detection system.

The preferred circuit diagram for FIG. 1 is shown in FIG. 4. Note that all of the inverters 76, 84, 94, and 104, as described in conjunction with FIG. 2, are identical. They each have an input resistor 132 connected to the base 136 of the transistor 134. The emitter 138 of the transistor 134 is connected to ground. The collector 140 of the transistor 138, which is the output, connects through a resistor 142 to the voltage source $V_s$.

Each of the NOR gates 42, 44, 46, 48, 50, 52, and 54, as described in conjunction with FIG. 2, have identical configurations even though the number of input diodes 144, 146, 148, 150, 152, 154, and 156, respectively, may vary. Each of the NOR gates contain an inverter as described in the previous paragraph. Like numerals will apply to comparable component parts of the inverters in the signal conditioner 12 or the encoding logic 14. The inverters consist of a transistor 134, the base 136 of which is connected to the input resistor 132. The emitter 138 is connected to ground. The collector side 140 of the transistor 134, which is the output of the NOR gate, connects to the light-emitting diodes 69. Also connected to the collector 140 of the transistor 134 is a resistor 142 the other side of which connects to the voltage source $V_s$. Because a single light-emitting diode may not provide a segment of sufficient length, two lighting diodes work as shown in series. By using two light-emitting diodes (their respective numeral plus X or Y) in series, a segment of sufficient length and illumination can be obtained. It is realized that any number of light-emitting diodes can be used to form a particular segment. As technology in this field develops, it may be possible for one light-emitting diode to provide sufficient illumination to give the size of segment or character desired.

The voltage source $V_s$ which is used to drive the signal conditioning 12 and encoder logic 14, as well as the light-emitting diodes 69, is regulated as shown in FIG. 5. The regulator 158 consists of a resistor 160 in series with the zener diode 162, the resistor side being connected to the battery voltage and the zener diode side being connected to ground, wherein regulated voltage output $V_s$ can be obtained between the resistor 160 and the zener diode 162. In a laboratory model, a voltage source $V_s$ of 3.6 volts was used.

In the laboratory breadboard model, resistor-transistor logic plus discrete diodes were used. However, diode-transistor logic could have been incorporated at a slight increase in complexity. On the laboratory model, no attempt was made to miniaturize the circuit board. In production quantities the entire circuit, including the light-emitting diodes, could be fabricated on a single monolithic hybrid chip which is packaged to mount directly on the automobile dash. Conversion of this device to a custom package incorporating integrated circuits, light-emitting diodes, resistors, regular diodes, and, if necessary, fiber optics is economically feasible in production quantities. State of the art semiconductors presently considers a theoretical packing density of 3.5 million components per square inch on the chip. External mechanical connections drastically reduce this value. However, since circuitry for this unit requires less than 100 individual components, a wafer dimension of 50 by 100 mills is more than adequate.

Application of the above philosophy to other vehicle subsystems becomes readily apparent. A single character display module could monitor engine and accessories as noted in table II.

TABLE II

| Parameter | Condition | Display |
| --- | --- | --- |
| Generating system | Discharge |  |
| Engine temperature | Over temp |  |
| Oil pressure | Low |  |
| Fuel | Low |  |
| Air conditioning | Malfunction |  |
| Seat belts | Unlatched |  |

The vehicles of the future will probably contain many applications of integrated circuits and light-emitting diodes in the display system. This adds, not only to the indications available, but also to the comfort of the operator with essentially no increase in cost.

What is claimed is:

1. A vehicle malfunction indicator system comprising:
    a plurality of sensors, each of said sensors being adapted to detect a malfunction in a component of the vehicle;
    a plurality of light-emitting diodes arranged in segments of a matrix, said segments being arranged to form visual character representations when different combinations of the segments are activated; and
    gating means for each of said segments, each of said gating means having an output terminal connected to its corresponding segment and a plurality of inputs, each input of each gating means being connected to the output of one of said sensors, the output of each of said sensors being connected to the input of more than one of said gating means, the output of each of said sensors being connected to a different combination of gating means than the output of any other sensor;
    each of said gating means activating its corresponding segment when any of the sensors connected to any of its input terminals produces an output signal.
2. The invention of claim 1:
    each of said gating means being a NOR gate, whereby a positive voltage level is maintained in the output of the latter in the absence of a signal to the input of a corresponding NOR gate;
    said light-emitting diodes being connected between the output of the corresponding NOR gate and a voltage source.
3. The automotive malfunction detection system, as recited in claim 1, still further comprising a fiber optic display wherein said character representations from said light-emitting diodes are visually displayed in alphabetic and numeric form.
4. A brake malfunction indication system, as recited in claim 1, wherein said sensors indicate dangerous lining wear, vacuum loss, fluid level in master cylinder, adaptive brake malfunction, parking brake "on," split system malfunction, and self-test on start, said brake malfunction indication system further comprising:
    a fiber optic display means for giving better visual effects to said letters indicated by said light-emitting diodes.

* * * * *